United States Patent Office 3,452,048
Patented June 24, 1969

3

3,452,048
SUBSTITUTED BENZYLAMINE DERIVATIVES AND PROCESS FOR THEIR PRODUCTION
John Shavel, Jr., Mendham, and George Bobowski, Morristown, N.J., assignors to Warner-Lambert Pharmaceutical Company, Morris Plains, N.J., a corporation of Delaware
No Drawing. Filed May 18, 1966, Ser. No. 550,952
Int. Cl. C07d 5/16, 51/78; A61k 25/00
U.S. Cl. 260—347.4                4 Claims

ABSTRACT OF THE DISCLOSURE

A class of substituted benzylamines of the formula:

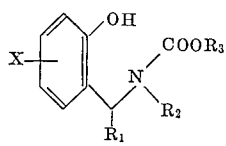

wherein X is hydrogen, lower alkoxy or halogen $R_1$ is heterocyclic, $R_2$ is lower alkyl or lower alkenyl, and $R_3$ is lower alkyl.

These compounds are useful as anti-microbial agents.

---

This invention relates to substituted benzylamines of the formula:

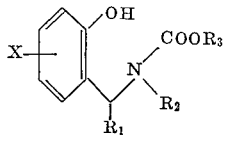

wherein X is hydrogen, lower alkoxy such as methoxy or ethoxy and halogen; $R_1$ represents furyl, 2-lower alkyl-furyl, 2-ketocyclohexyl, lower alkoxy, 3-methyl-2-quinoxalinyl; $R_2$ represents lower alkyl or lower alkenyl and $R_3$ represents lower alkyl.

In the above definitions lower alkyl is from 1 to 6 carbon atoms such as methyl, ethyl, propyl, isopropyl, butyl and isobutyl and lower alkenyl is from 2 to 6 carbon atoms such as ethynyl and the like. Halogen includes all four members of its family, i.e. chlorine, bromine, fluorine, and iodine.

The compounds of this invention are useful as anti-microbial agents against *C. albicans*. In order to use these compounds as antimicrobials, about 1 part by weight of a selected active ingredient is blended with about 99 parts by weight of an inert carrier such as talc or petrolatum. The resulting product may be applied topically.

According to the process of this invention the above compounds are prepared by subjecting compounds of the formula:

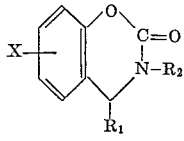

to a solvolysis process in alcohol in the presence of an alkali. The reaction that takes place may be represented by the following scheme:

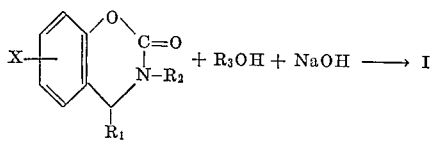

4

The symbols X, $R_1$, $R_2$ and $R_3$ are as defined.

This solvolysis process may be effected at ambient temperature such as from 20–30° C. for a period of about 2–6 hours.

The preparation of the starting material II above is fully disclosed and described in our copending application Ser. No. 504,142, filed Oct. 23, 1965.

The following examples are included in order further to illustrate the invention. All temperatures referred to in these examples are given in degrees centigrade and room temperature is from about 20 to 30° C.

Example 1.—Methyl[α-(2-furyl)-o-hydroxybenzyl]-methylcarbamate

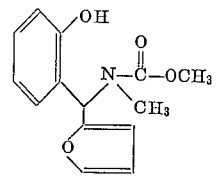

A mixture of 2.0 g. of 3,4-dihydro-4-(2-furyl)-3-methyl-2H-1,3-benzoxazin-2-one and 0.8 g. of sodium hydroxide pellets in 10 ml. of absolute methanol is stirred until a clear, yellow solution results, and allowed to stand at room temperature. The residue is dissolved in water, adjusted to pH 5.0 with acetic acid, and extracted twice with 50 ml. of chloroform. The combined extracts are dried over sodium sulfate and the solvent is removed in vacuo. Trituration with methanol gives 1.2 g. of methyl [α-(2-furyl)-o-hydroxybenzyl]methylcarbamate as off-white crystals, M.P. 140–141°, dec. Recrystallization from methanol gives analytically pure, nearly white crystals, M.P. 142–143°, dec., $\lambda_{max.}^{EtOH}$ mμ (ε) 216 (17,300), 275 (3,200), 282 sh. (2,850); $\gamma_{max.}^{Nujol}$ 747 (ms.), 756 (ms.), 961 (m.), 1150 (ms.), 1242 (m.), 1255 (ms.), 1330 (ms.), 1371 (ms.), 1507 (m.), 1603 (m.), 1671 (s.), 1684 (s.), 3270 (ms.) cm.$^{-1}$; $\nu_{max.}^{CHCl_3}$ 1150 (s.), 1230–1200 (wide band, ms.), 1325 (ms.), 1390 (ms.), 1459 (ms.), 1488 (s.), 1665 (vs.), 2980 (w.), 3280 (m.)

Analysis for $C_{14}H_{15}NO_4$: Calcd.: C, 64.36; H, 5.79; N, 5.36. Found: C, 64.67, 64.56; H, 5.91, 5.88; N, 5.46, 5.43.

Example 2.—Methyl[α-(2-furyl-5-methyl)-o-hydroxy-benzyl]methylacarbamate

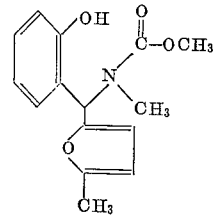

The procedure of Example 1 is applied to the 5-methyl analogue except that ether-cyclohexane (1:1) is used as a recrystallization solvent. Thus, the mixture of 6.0 g. of 3,4-dihydro-4(2-furyl-5-methyl)-3-methyl-2H-1,3-benzoxazin-2-one and 1.0 g. of sodium hydroxide pellets in 25 ml. of absolute methanol gives 3.8 g. of methyl[α-(2-furyl-5-methyl)-o-hydroxybenzyl]methylcarbamate as analytically pure, white crystals, M.P. 100–101°, dec.;

$\lambda_{max.}^{EtOH}$ mμ (ε) 218.5 (16,800), 275 (3,200), 281 sh. (2,900); $\gamma_{max.}^{Nujol}$ 747 (ms.), 786 (ms.), 950 (m.), 1013 (m.), 1145 (ms.), 1188 (ms.), 1306 (s.), 1481 (ms.), 1568 (m.), 1607 (m.), 1667 (vs.), 3230 (ms.), cm.$^{-1}$; $\nu_{max.}^{CHCl_3}$ 1147 (s.), 1230–1188 (wide band, m.), 1326–1305 (wide band, ms.), 1386 (ms.), 1455 (ms.), 1486 (s.), 1660 (vs.), 2980–2940 (split, w.), 3230 (m.), cm.$^{-1}$ Analysis for $C_{15}H_{17}NO_4$: Calcd.: C, 65.44; H, 6.22; N, 5.09. Found: C, 65.14; H, 6.25; N, 5.26.

Example 3.—Ethyl[α-(2-furyl)-o-hydroxybenzyl]-
methylcarbamate

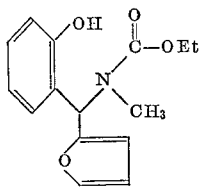

Applying the same procedure as in the Example 1 and using absolute ethanol instead of methanol, ethyl[α-(2-furyl)-o-hydroxybenzyl]methylacarbamate is obtained. An analytical sample is obtained by the recrystallization from cyclohexane, M.P. 104.5–106°;

λ$_{max.}^{EtOH}$ mμ (ε) 215 (17,550), 275 (3,200), 281 sh. (2,900); γ$_{max.}^{Nujol}$ 734 (ms.), 754 (m.), 1001 (m.), 1142 (ms.), 1301 (ms.), 1478 (m.), 1663 (vs.), 3220 (m.); ν$_{max.}^{CHCl_3}$ 1008 (m.), 1148 (s.), 1230–1195 (wide band, s.), 1312 (s.), 1380 (m.), 1400 (m.), 1453 (ms.), 1487 (s.), 1648 (vs.), 1660 (vs.), 2960 (m.), 3200 (m.), cm.$^{-1}$

*Analysis* for $C_{15}H_{17}NO_4$: Calcd.: C, 65.44; H, 6.22; N, 5.09. Found: C, 65.36; H, 6.27; N, 4.96.

Example 4.—Ethyl[(o-hydroxyphenyl)(2-oxocyclo-
hexyl)methyl]carbamate

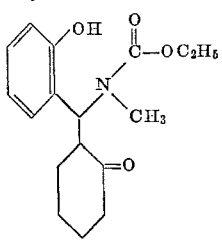

A mixture of 4.0 g. of 3,4-dihydro-4-(2-oxo-cyclohexyl)-3-methyl-2H-1,3-benzoxazin-2-one, and 0.7 g. of sodium hydroxide pellets in 40 ml. of absolute ethanol is stirred for 10 minutes and the resulting clear yellow solution is allowed to stand for two hours. Ice-cold water is added and the solution is adjusted to pH 5.0 with acetic acid. After the excess ethanol is removed at room temperature, the residue is extracted twice with 50 ml. of chloroform. The combined extracts are dried over sodium sulfate and the solvent is removed in vacuo. Trituration of the residue with ethyl acetate gives 2.9 g. of ethyl[(o-hydroxyphenyl)(2-oxocyclohexyl)methyl]carbamate as white crystals, M.P. 247–248°. Two recrystallizations from ethyl acetate gives analytically pure, white crystals, M.P. 248–249° decomp.;

λ$_{max.}^{EtOH}$ mμ (ε) 215 (8,450), 275 (3,000), 282 (2,660); γ$_{max.}^{Nujol}$ 751 (m.), 970 (m.), 1066 (m.), 1108 (m.), 1253 (ms.), 1603 (m.), 1654 (s.), 1663 (s.), 3100 (m.) cm.$^{-1}$; ν$_{max.}^{CHCl_3}$ 971 (ms.), 1040–1018 (wide band, ms.), 1070 (m.), 1240 (m.), 1408 (m.), 1456 (ms.), 1496 (m.), 1604 (m.), 1613 (m.), 1680 (vs.), 1695 (s.), 2980 (m.), 3320 (m.), 3660 (w.) cm.$^{-1}$

*Analysis* for $C_{17}H_{23}NO_4$: Calcd.: C, 66.86; H, 7.59; N, 4.59. Found: C, 66.77; H, 7.63; N, 4.46.

Example 5.—Methyl(2-hydroxy-α,3-dimethoxybenzyl)-
methylcarbamate

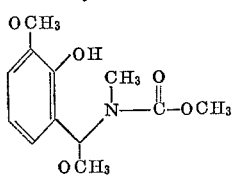

A mixture of 2.0 g. of 3,4-dihydro-4,8-dimethoxy-3-methyl-2H-1,3-benzoxazin-2-one and 0.7 g. of NaOH pellets in 20 ml. of absolute methanol is stirred for 20 minutes and then the clear solution is allowed to stand at room temperature overnight. The solution is adjusted to pH 5.0 with ice-cold acetic acid and the solvent is removed at room temperature. The residue is taken up with a little water and extracted with 50 ml. of chloroform. The chloroform extract is washed with water, dried over $Na_2SO_4$, and the solvent evaporated. Trituration with cyclohexaneether (5:1) gives 1.7 g. of methyl(2-hydroxy-α-3-dimethoxybenzyl)methylcarbamate as off-white crystals, M.P. 78–80°. Recrystallization from cyclohexane gives analytically pure white crystals, M.P. 78.5–80°;

λ$_{max.}^{EtOH}$ mμ (ε) 218 sh. (8500), 277 (3040); γ$_{max.}^{Nujol}$ 1068 (ms.), 1266 (s.), 1327 (ms.), 1685 (vs.), 3340 (m.), cm.$^{-1}$

*Analysis* for $C_{12}H_{17}NO_5$: Calcd.: C, 56.46; H, 6.71; N, 5.49. Found: C, 56.53; H, 7.01; N, 5.68.

Example 6.—Methyl [1-(o-hydroxyphenyl)-2-(3-methyl-
2-quinoxalinyl)ethyl]methylcarbamate

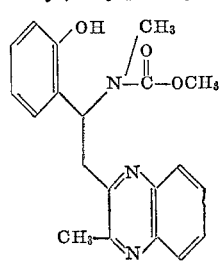

A mixture of 4.5 g. of 2-(3,4-dihydro-3-methyl-2-oxo-2H-1,3-benzoxazin-4-ylmethyl)-3-methylquinoxaline and 2.0 g. of KOH pellets in 30 ml. of dry methanol is stirred for 15 minutes, and the resulting clear solution is allowed to stand for 45 minutes at room temperature. Acetic acid is added at 0° to pH 5.5 and the solvent is removed under nitrogen at 45°. The residue is taken up with 15 ml. of water and extracted twice with 50 ml. of chloroform. The combined chloroform extracts are washed with water, dried over $Na_2SO_4$, and the solvent is removed under nitrogen. Single crystallization from ethyl acetate gives 4.3 g. of methyl [1-(o-hydroxyphenyl)-2-(3-methyl-2 - quinoxalinyl)ethyl]methylcarbamate as analytically pure white crystals, M.P. 143–144°;

λ$_{max.}^{EtOH}$ mμ (ε) 237 (34,000), 274–284 plateau (7520), 318 (9450); γ$_{max.}^{Nujol}$ 758 (s.), 1143 (m.), 1483 (s.), 1646 (vs.), 3100 (w.) cm.$^{-1}$

*Analysis* for $C_{20}H_{21}N_3O_3$: Calcd.: C, 68.36; H, 6.02; N, 11.96. Found: C, 68.19; H, 5.86; N, 11.69.

Example 7.—Diethyl (2-hydroxy-3-methoxybenzylidene)
dicarbamate

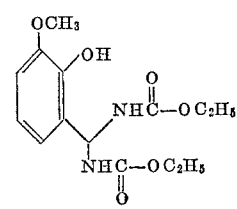

A mixture of 4.2 g. of ethyl 3-allyl-3,4-dihydro-8-methoxy-2-oxo-2H-1,3-benzoxazine-4-carbamate, and 1.5 g. of NaOH-pellets in 25 ml. of absolute ethanol is stirred for 10 minutes and the resulting clear solution is allowed to stand at room temperature for two hours. Acetic acid is added at 0° to pH 5.5 and the solvent is removed in vacuo at 30°. The residue is taken up with ethyl acetate, washed with water, dried over $Na_2SO_4$, and the solvent evaporated. The material is passed over 30 g. of magnesium silicate, ether-ethyl acetate (1:1) being used as eluents. Ten (40 ml. each) fractions are collected and the fractions 3 to 6, on trituration with ethyl acetate, gives 0.3 g. of diethyl (2-hydroxy-3-methoxybenzylidene) dicarbamate as white crystalline product, M.P. 142–143°.

Recrystallization from ethyl acetate gives analytically pure material, M.P. 143–144°;

$\lambda_{max.}^{EtOH}$ m$\mu$ ($\epsilon$) 218 (8500), 276–280) plateau (2950); $\gamma_{max.}^{Nujol}$ 1025 (ms.), 1255 (s.), 1492 (vs.), 1708 (vs.), 1725 (s.), 3320 (ms.), 3410 (m.) cm.$^{-1}$

*Analysis* for $C_{14}H_{20}N_2O_6$: Calcd.: C, 53.84; H, 6.45; N, 8.97. Found: C, 53.95; H, 6.54; N, 8.86.

It is understood that the foregoing detailed description is given merely by way of illustration and that many variations may be made therein without departing from the spirit of our invention.

Having described our invention, what we desire to secure by Letters Patent is:

1. A compound of the formula:

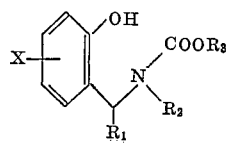

wherein X is hydrogen, lower alkoxy, or halogen; $R_1$ is furyl, 2-lower alkylfuryl, $R_2$ is lower alkyl or lower alkenyl and $R_3$ is lower alkyl.

2. Methyl [α-(2-furyl) - o - hydroxybenzyl]methylcarbamate.

3. Methyl [α-(2-furyl - 5 - methyl)-o-hydroxybenzyl] methylcarbamate.

4. Ethyl [α-(2-furyl) - o - hydroxybenzyl]methylcarbamate.

References Cited

Shaw et al.: Chem. Abstracts, vol. 47, p. 11638e (1953).

NICHOLAS S. RIZZO, *Primary Examiner.*

BERNARD I. DENTZ, *Assistant Examiner.*

U.S. Cl. X.R.

260—250; 424—285